United States Patent
Heidemann et al.

(10) Patent No.: US 11,959,526 B2
(45) Date of Patent: Apr. 16, 2024

(54) SPRING ELEMENT, IN PARTICULAR JOUNCE BUMPER, FOR A VEHICLE SUSPENSION

(71) Applicant: BASF Polyurethanes GmbH, Lemfoerde (DE)

(72) Inventors: Josef Heidemann, Lemfoerde (DE); Anthony Touzard, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 239 days.

(21) Appl. No.: 17/595,983

(22) PCT Filed: Jun. 3, 2020

(86) PCT No.: PCT/EP2020/065377
§ 371 (c)(1),
(2) Date: Dec. 1, 2021

(87) PCT Pub. No.: WO2020/245217
PCT Pub. Date: Dec. 10, 2020

(65) Prior Publication Data
US 2022/0234405 A1 Jul. 28, 2022

(30) Foreign Application Priority Data
Jun. 3, 2019 (EP) .................................... 19177981

(51) Int. Cl.
*B60G 7/04* (2006.01)
*F16F 1/373* (2006.01)
*F16F 9/58* (2006.01)

(52) U.S. Cl.
CPC .............. *F16F 1/3732* (2013.01); *B60G 7/04* (2013.01); *F16F 9/58* (2013.01); *B60G 2204/4502* (2013.01)

(58) Field of Classification Search
CPC ...................................................... F16F 1/3732
See application file for complete search history.

(56) References Cited

U.S. PATENT DOCUMENTS

2004/0168464 A1* 9/2004 Seo ........................ F25D 23/006
62/295
2007/0017761 A1* 1/2007 Huprikar .................. B60G 7/04
188/321.11
(Continued)

FOREIGN PATENT DOCUMENTS

AT 396813 B * 10/1993 ......... B29C 67/0014
CN 109154347 A * 1/2019 ............. B60G 11/22
(Continued)

*Primary Examiner* — Nicole T Verley
(74) *Attorney, Agent, or Firm* — Grüneberg and Myers PLLC

(57) ABSTRACT

A spring element, in particular a jounce bumper, for a jounce bumper assembly, contains a longitudinal axis, a base body extending along the longitudinal axis, and an end portion configured for being brought into contact with a vehicle part moving relatively to the spring element. The base body is elastically deformable between an uncompressed basic state and a compressed state in which the base body is at least partially compressed in the direction of the longitudinal axis. The end portion contains a circumferential outer surface, and at least one recess in the circumferential outer surface. The recess extends inwards and defines a hollow space in the base body.

19 Claims, 9 Drawing Sheets

(56) References Cited

U.S. PATENT DOCUMENTS

2019/0113097 A1\* 4/2019 Thye-Moormann ...... F16F 9/58
2022/0074459 A1\* 3/2022 Kawazoe .............. F16F 1/3732

FOREIGN PATENT DOCUMENTS

| CN | 114151485 A | \* | 3/2022 | ............ F16F 1/3732 |
| --- | --- | --- | --- | --- |
| DE | 10105791 A1 | \* | 8/2002 | .............. F16F 1/376 |
| DE | 102004049638 A1 | \* | 4/2006 | ............ F16F 1/3732 |
| DE | 102019132345 A1 | \* | 7/2020 | .............. F16F 1/028 |
| DE | 202021103187 U1 | \* | 8/2021 | |
| JP | 2019521290 A | \* | 7/2019 | |
| KR | 20110045045 A | \* | 5/2011 | |
| KR | 20190013864 A | \* | 2/2019 | |
| SE | 423613 B | \* | 5/1982 | |
| WO | WO-2009037207 A1 | \* | 3/2009 | .............. F16F 1/373 |
| WO | WO-2010020588 A1 | \* | 2/2010 | ............ F16F 1/3732 |
| WO | WO-2014055599 A1 | \* | 4/2014 | ............ B60G 11/22 |
| WO | WO-2016133780 A1 | \* | 8/2016 | ............ B60G 11/22 |
| WO | WO-2017182460 A1 | \* | 10/2017 | ............ B60G 11/22 |
| WO | WO-2017202620 A1 | \* | 11/2017 | ............ B60G 11/22 |
| WO | WO-2021110850 A1 | \* | 6/2021 | ......... B29C 44/1266 |
| WO | WO-2021165535 A1 | \* | 8/2021 | .............. B60G 7/04 |

\* cited by examiner

SPRING ELEMENT, IN PARTICULAR JOUNCE BUMPER, FOR A VEHICLE SUSPENSION

CROSS-REFERENCE TO RELATED APPLICATIONS

This application is the National Stage entry under § 371 of International Application No. PCT/EP2020/065377, filed on Jun. 3, 2020, and which claims the benefit of priority to European Application No. 19177981.8, filed on Jun. 3, 2019. The content of each of these applications is hereby incorporated by reference in its entirety.

BACKGROUND OF THE INVENTION

Field of the Invention

The invention relates to a spring element, in particular jounce bumper for a jounce bumper assembly. The invention furthermore relates a jounce bumper assembly having such a spring element, and to a vehicle, in particular a passenger motor vehicle having such a jounce bumper assembly.

Description of Related Art

Spring elements of the aforementioned type are generally known. They are used in cars, for example inside the chassis. They are used in particular as spring and damping elements, typically, to support the main vehicle suspension spring and to limit the deflection of the suspension and the wheel travel. In addition to the main suspension spring, which is frequently based on metal springs, use is virtually always made of additional spring elements, preferably composed of resilient material. These spring elements are customarily solid or hollow bodies which are formed concentrically and have different diameters and/or wall thicknesses along the spring axis. In principle, these spring elements could also act as main spring, but they frequently take on an end stop function in combination with the main spring. They influence the force-travel characteristic of the sprung wheel here by the formation or reinforcement of a progressive characteristic of the vehicle suspension. The pitching effects of the vehicle can thus be reduced and the rolling support reinforced. In particular, the starting rigidity is optimized by the geometrical configuration; this has a crucial effect on the suspension comfort of the vehicle. This function increases the driving comfort and ensures a very high degree of driving safety. The specific configuration of the geometry results in virtually constant component properties over the service life.

One difficulty of the three-dimensional configuration of spring elements, e.g. jounce bumper, resides in a frequently desired, particularly soft initial stiffness behavior, which is also referred to as soft starting of the spring element. In order to achieve such a soft starting, laid-open application DE 102004049638, for example, describes forming an end portion of the spring element with encircling bending lips (also referred to as a "flower shape").

In operation, the spring element is compressed from an uncompressed basic state along its longitudinal axis into an at least partially compressed state, thereby dissipating energy by deforming. As has been explained above, the initial stages of the deformation of the spring element determine how soft the spring is perceived. Thus, minimal resistance is desired at the initiation of deformation. Since the overall impact forces on the spring element are significant in vehicle operation, however, the spring element needs to withstand substantial loads, thus leading to a demand for a progressive increase in stiffness.

In order to combine a soft initial deformation behavior with progressive stiffness, elaborate geometrical designs of the tip portion (cf. flower shape) of the spring element have been designed in the past. While significant progress has been made over time and current designs do achieve satisfactory behavior as regards the aforementioned characteristics, current designs often have a drawback when it comes to manufacturing. The elaborate outside contour of current spring element designs requires complicated molding shapes which presents a limit to how fast and how cost-efficient spring elements can be produced.

SUMMARY OF THE INVENTION

It was therefore an object of the invention to provide a spring element which alleviates the drawbacks mentioned above as far as possible. In particular, it was an object of the invention to suggest a spring element which is easy to manufacture without sacrificing initial deformation softness and progressive stiffness.

The invention achieves the object by suggesting a spring element of the initially mentioned type comprising a longitudinal axis and a base body extending along the longitudinal axis, the base body being elastically deformable between an uncompressed basic state and a compressed state in which the base body is at least partially compressed in the direction of the longitudinal axis, and an end portion configured for being brought into contact with a vehicle part moving relatively to the spring element, wherein the end portion comprises a circumferential outer surface, and at least one recess in the circumferential outer surface, said recess extending inwards and defining a hollow space in the base body.

DETAILED DESCRIPTION OF THE INVENTION

Figure 1:
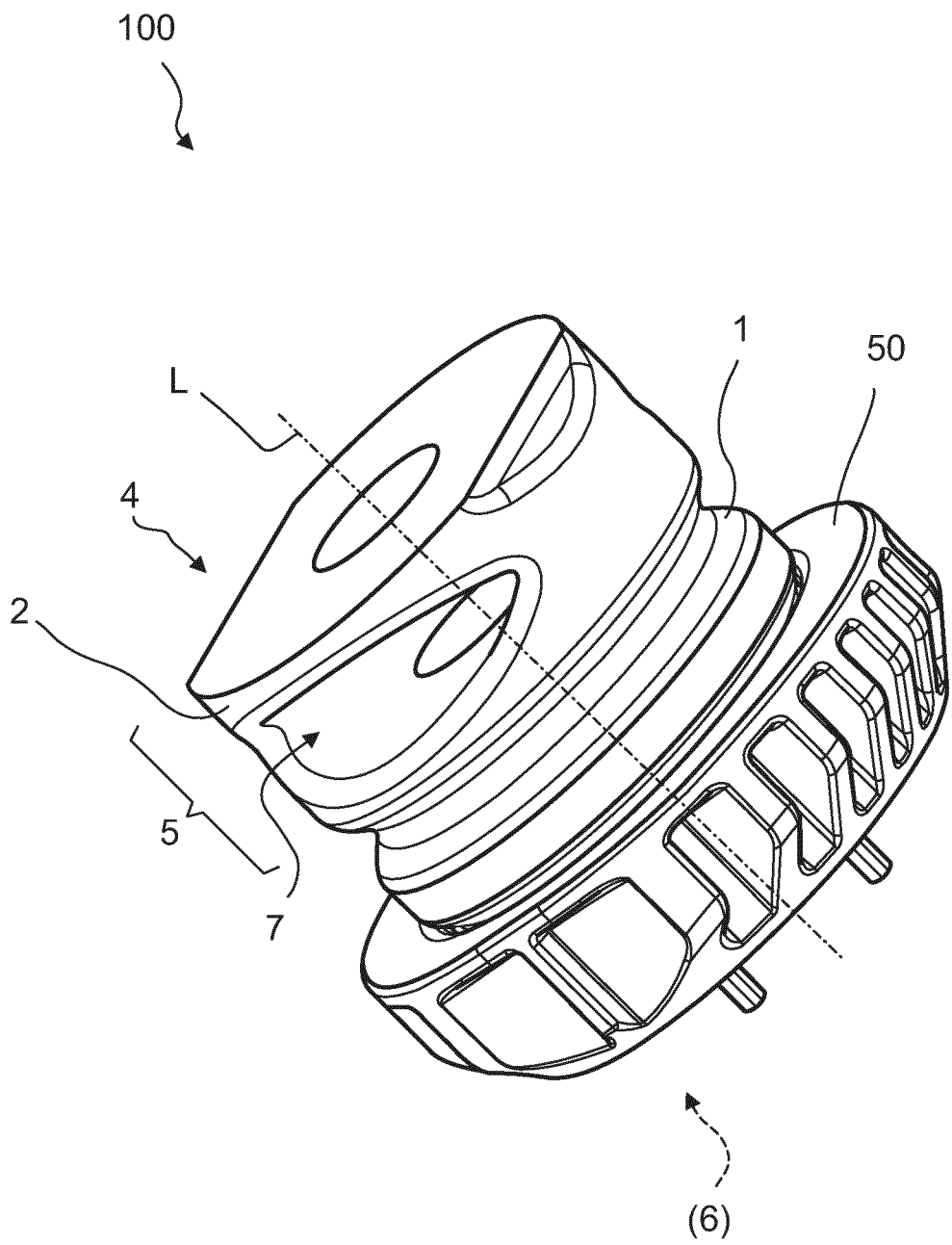
FIG. 1 shows a schematic representation of a jounce bumper assembly that is part of a vehicle suspension having a spring element according to a first preferred embodiment.

With regard to the invention, the term "compressed in the direction of the longitudinal axis" is to be understood as encompassing any compression that causes a variation in length in the direction of the longitudinal axis. This can either be a strictly linear compression movement of the spring element, but also a compression movement that follows a path that is angled with respect to the longitudinal axis and that may be a straight path or a curved path, e.g. a circular path, and consequently is defined by a first movement component in the direction of the longitudinal axis and a second movement component perpendicular thereto.

Furthermore, the term "circumferential" is to be understood to refer to the circumference of the base body. The term "circumferential direction" refers to a direction along the circumference, perpendicular to the longitudinal axis, and includes circular circumferences as well as non-circular circumferences.

Under circumferential outer surface, the lateral surface, typically oval or cylindrical, of the spring element is to be understood. In other words, the invention suggests providing a recess which is not directly at the tip of the end portion as with conventional flower designs, but instead providing a recess which is extending inwards from the outer circumferential surface of the spring element.

The invention is based upon the realization that transforming the recess in the manner discussed herein above, the outside geometry of the spring element can be rendered less complex, making it easier to shape in a molding process. If the molding shape is less complex, the spring element is easier and faster to manufacture, which increases the overall cost efficiency of the procedure. At the same time, the inventive recess in the end portion of the spring element allows for an improved, that is to say softer, initial deformation behavior.

Depending on the rate of compression, once the spring element is compressed sufficiently such that the recess is partially or completely collapsed, the invention furthermore achieves a very good compromise between initial deformation softness and progressive stiffness of the spring element in operation.

In a preferred embodiment, the end portion comprises an end face and the at least one recess is spaced apart from the end face in the direction of the longitudinal axis.

Further preferably, the end face—in the uncompressed state of the base body—comprises a substantially planar surface and is oriented perpendicular to the longitudinal axis. This type of geometry makes molding and demolding of the spring element very efficient.

The invention suggests in a further preferred embodiment that the at least one recess extends radially towards the longitudinal axis, and has a maximal lateral width in the direction perpendicular to the longitudinal axis that is smaller than the diameter of the base body in the end portion. This maximal lateral width, hereinafter referred to also as the lateral width, preferably has a width of 90% or less of the outside diameter of the base body in the end portion. By doing so, the spring element can maintain a basic outside diameter in principle, since the recess does not impact the outside contour of the spring element in regions adjacent to the recess. When deformed from the uncompressed basic state into the compressed state, the recess will collapse, providing the soft initial deformation resistance. When the recess has collapsed partly or completely, the stiffness of the spring element will increase progressively, achieving the desired characteristics.

Furthermore, in preferred embodiments the end face is no longer necessarily planar when the recess has collapsed, but instead is able to assume a concave shape. If the entity that comes into contact with the end portion, has a convex shape, such as a transverse axis, shaft or the like, the spring element even may exert a centering function towards the longitudinal axis of the spring element. The core benefit of the spring element according to the invention, namely the improved initial deformation softness, comes into effect just as well when in contact with planar counterparts, the centering function presents itself as an advantageous additional benefit.

In a preferred embodiment, the at least one recess extends all the way through the base body. This means that the recess extends from one lateral side of the base body through to the opposite side.

In a preferred alternative embodiment, the at least one recess only extends to a predetermined depth in the base body, said depth preferably being less than half the diameter of the base body. By not extending entirely through the base body, demolding may be facilitated after molding, for example.

In a further preferred embodiment, the spring element comprises a first recess and a second recess opposite the first recess, wherein each one of these recesses extends to a predetermined depth in the base body, said depth preferably being less than half the diameter of the base body. By doing so, a ridge or wall is left standing in between the first and second recesses, facilitating the outer mould sealing of the spring element and avoid stiffness jumps increasing stability of the spring element at least to a certain extent.

In a further preferred embodiment, the base body comprises a plurality of recesses spaced-apart from one another in the direction of the longitudinal axis, in the circumferential outer surface, said recesses respectively extending inwards and defining a hollow space in the base body. One, several or all of those recesses are preferably formed as described hereinabove and either continuous or non-continuous, and shaped and/or dimensioned as described hereinabove, to which statements reference is made to avoid unnecessary repetition.

Particularly preferred, at least one, several or all of the axially spaced-apart recesses therefore extends to a predetermined depth in the base body, said depth being less than half the diameter of the base body.

In a further preferred embodiment, the base body comprises a recess coaxial with the longitudinal axis, extending all the way through the end portion, preferably all the way through the base body. If the recess extends all the way through the end portion, the recess that is coaxial with the longitudinal axis and the at least one recess extending from the outer circumferential surface intersect one another. If the recess or recesses extend to a depth less than half the diameter in the end portion, preferably a separation wall is formed between the recesses to facilitate the outer mold sealing of the spring element during manufacturing.

In a further preferred embodiment, the at least one recess in the outer circumferential surface has an oblong cross section in a plane parallel to the longitudinal axis, said cross section being defined by a lateral width in a direction perpendicular to the longitudinal axis and an axial width in the direction of the longitudinal axis, said lateral width being greater than the axial width, the lateral width preferably being in a range of 110% of the axial width or greater, further preferably in a range of 200% of the axial width or greater.

Preferably, the cross section is partly or completely polygonal, polygonal with rounded/curved edges, or oval, in particular elliptical.

In a further preferred embodiment, the base body is partly or completely composed of an elastomer that is compressible in volume, preferably of a cellular polyisocyanate polyaddition product.

The base body here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m3 to 1100 kg/m3, preferably 300 kg/m3 to 800 kg/m3, a tensile strength according to DIN 53571 of 2 N/mm2, preferably 2 N/mm2 to 8 N/mm2, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP A 62 835, EP A 36 994, EP A 250 969, DE A 195 48 770 and DE A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two stage process:
 (a) isocyanate,
 (b) compounds reactive to isocyanates,
 (c) water and optionally
 (d) catalysts,
 (e) blowing agents and/or
 (f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high pressure technology, low pressure technology or in particular reaction injection molding technology (RIM) in open or preferably closed molding tools. The reaction is carried out in particular by compression in a closed molding tool. The reaction injection molding technology is described, for example, by H. Piechota and H. Röhr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

Hereinabove, the invention was described in a first aspect relating to the spring element itself.

In a second aspect, the invention, however, also relates to a jounce bumper assembly for damping a relative movement of two vehicle parts to one another, comprising a spring element configured to be operatively coupled to a first vehicle part, the spring element being formed in accordance as described, and in particular comprising a longitudinal axis and a base body extending along the longitudinal axis, the base body being elastically deformable between an uncompressed basic state and a compressed state in which the base body is at least partially compressed in the direction of the longitudinal axis, an end portion positioned on the base body so as to face away from the first vehicle part when mounted, and configured for being brought into contact with the second vehicle part moving relative to the spring element when mounted, wherein the end portion comprises a circumferential outer surface, and at least one recess in the circumferential outer surface, said recess extending inwards and defining a hollow space in the base body.

The benefits and preferred embodiments of the jounce bumper assembly are the same embodiments and benefits that were discussed with respect to the spring element under the first aspect herein above. Therefore, reference is made to the statements above to avoid unnecessary repetitions.

In a further aspect, the invention also relates to a vehicle, comprising a first vehicle part, a second vehicle part, wherein the first and second vehicle parts are configured to move relatively to one another during operation of the vehicle, and at least one jounce bumper assembly according to one of the embodiments described herein above, wherein the spring element is operatively coupled to the first vehicle part, and the end portion faces away from the first vehicle part and is configured for being brought into contact with the second vehicle part.

Preferably, the second vehicle part comprises a convex surface, in particular a cylindrical surface, oriented such that the longitudinal axis of the spring element intersects the convex surface. As a consequence, by virtue of the recess in the outer circumferential surface, when the second vehicle part contacts and deforms the spring element, the collapsing of the recess causes a concave outer end face configuration which helps to center the second vehicle part towards the longitudinal axis L of the spring element.

The preferred embodiments and benefits of the spring element discussed herein above are also preferred embodiments and benefits of the vehicle which is why reference is made to the descriptions thereof herein above to avoid unnecessary repetition.

Figure 2:
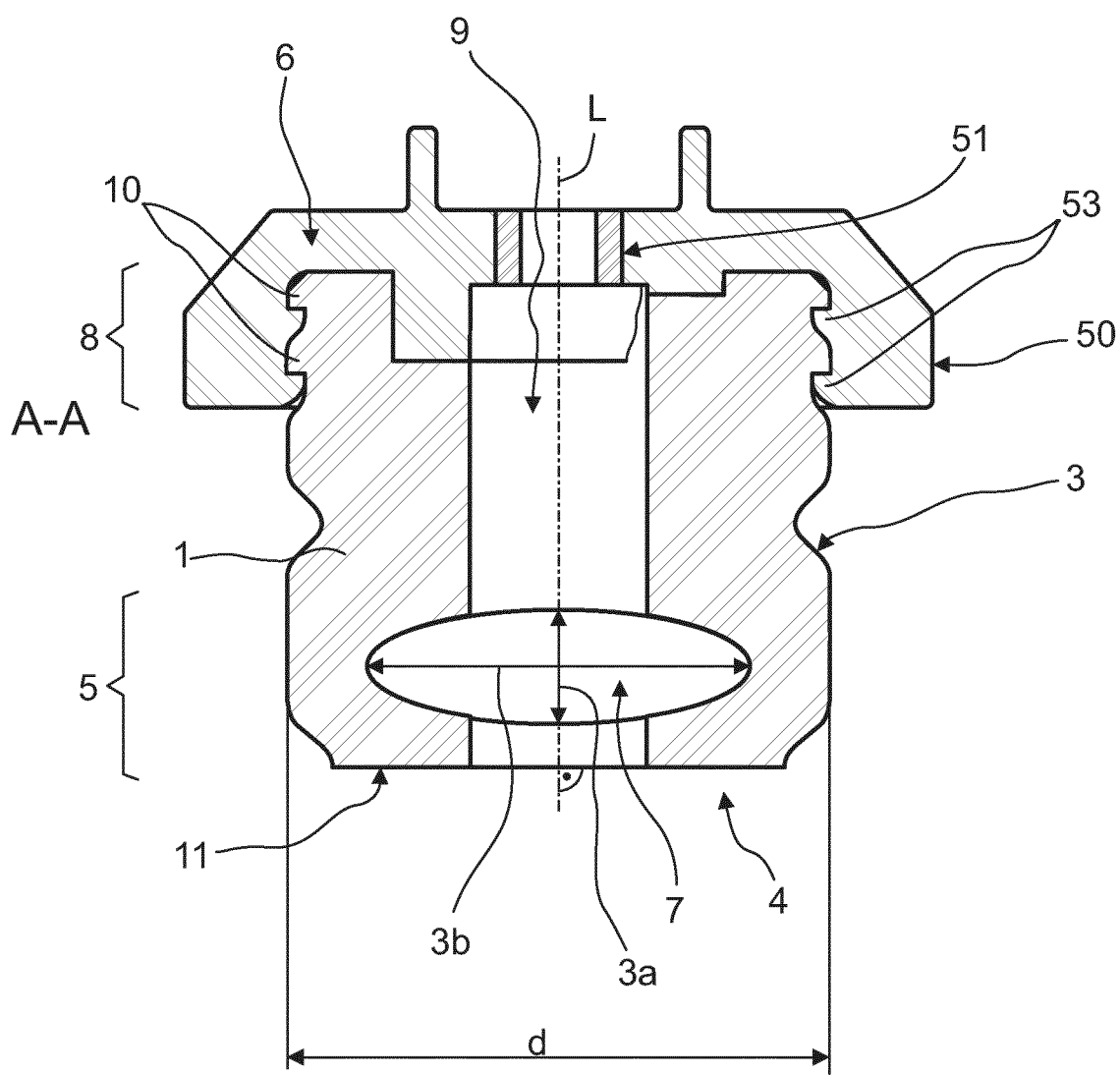
FIG. 2 shows a first cross sectional view of the assembly of FIG. 1.
Figure 3:
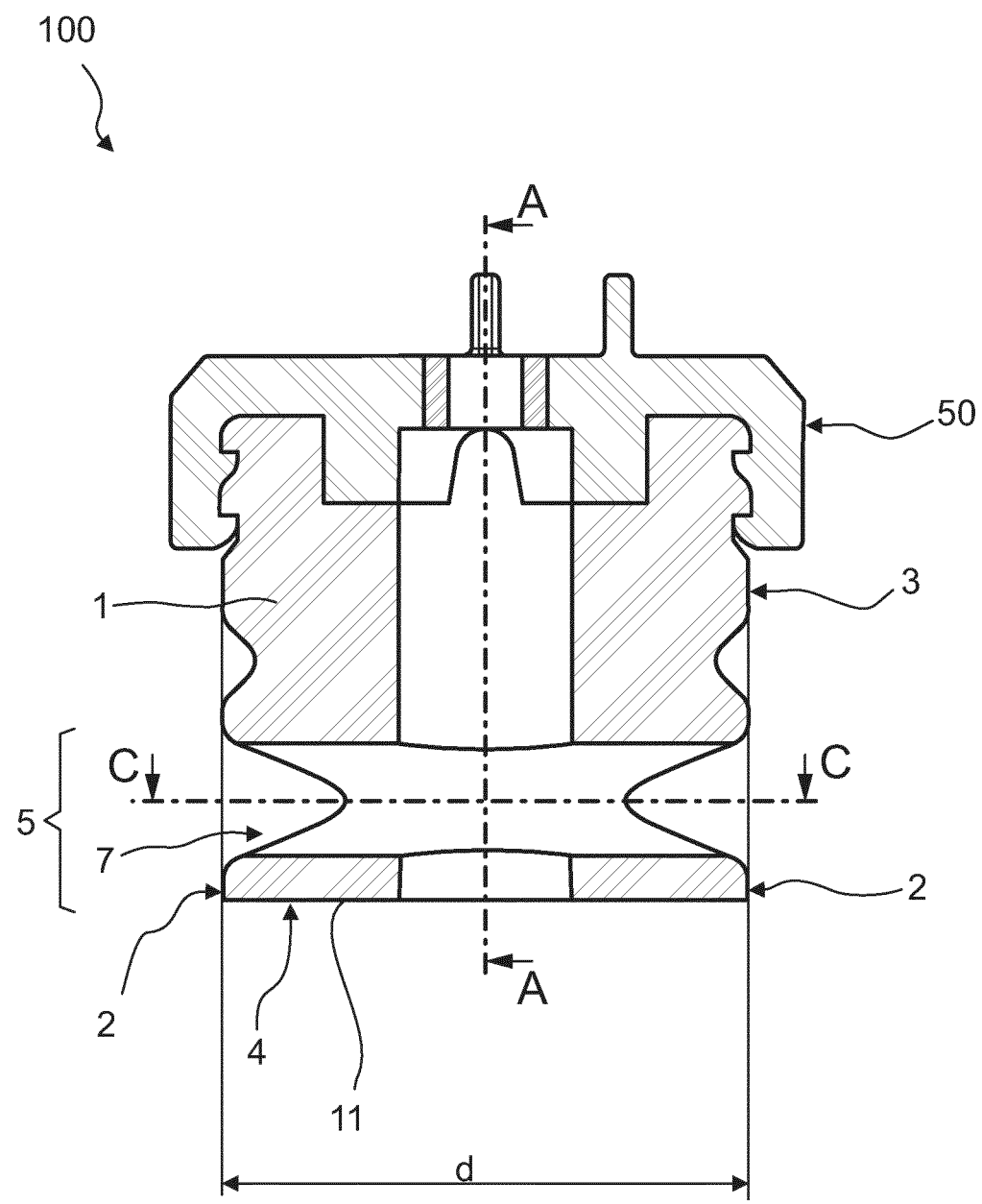
FIG. 3 shows a second cross sectional view of the assembly of FIGS. 1 and 2.
Figure 4:
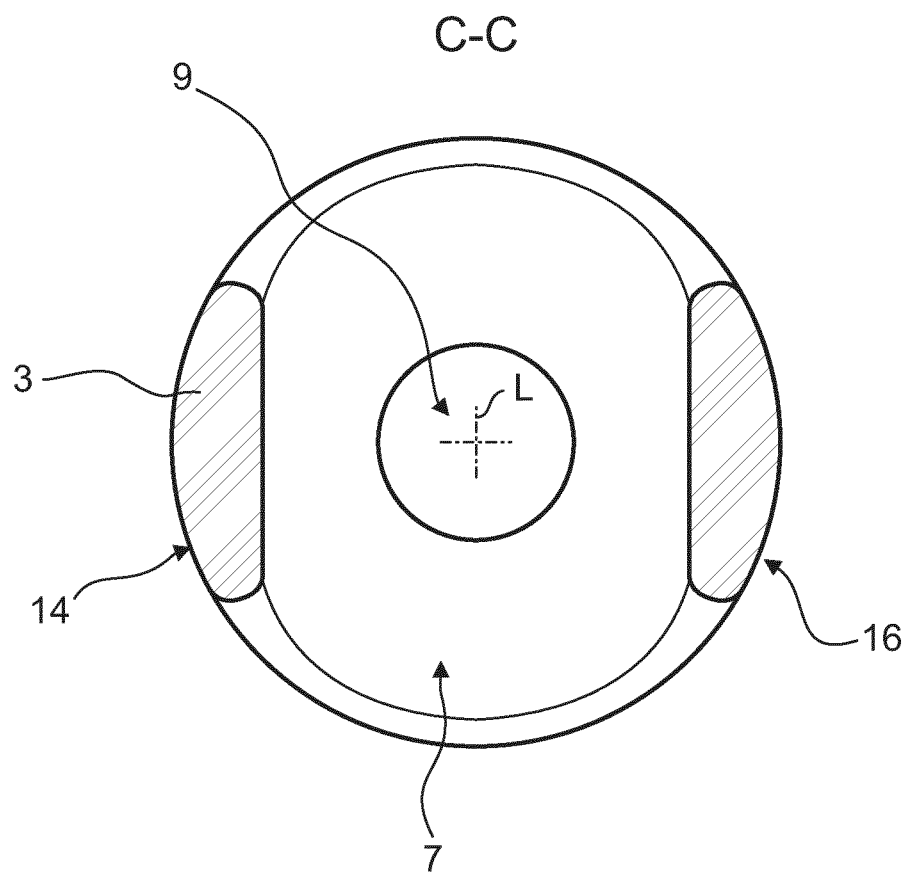
FIG. 4 shows a third cross sectional view of the embodiment of FIGS. 1-3.
Figure 5:
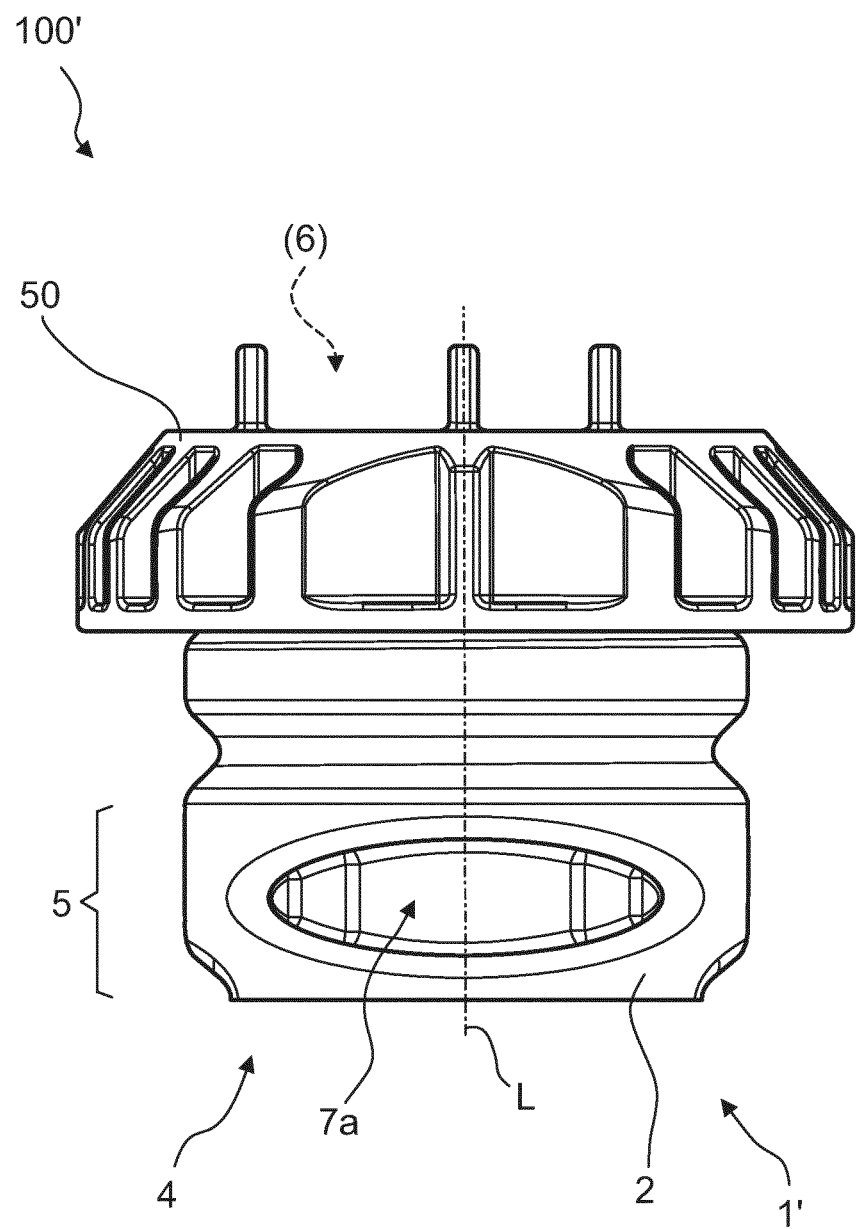
FIG. 5 shows a schematic representation of an assembly according to a second preferred embodiment.
Figure 6:
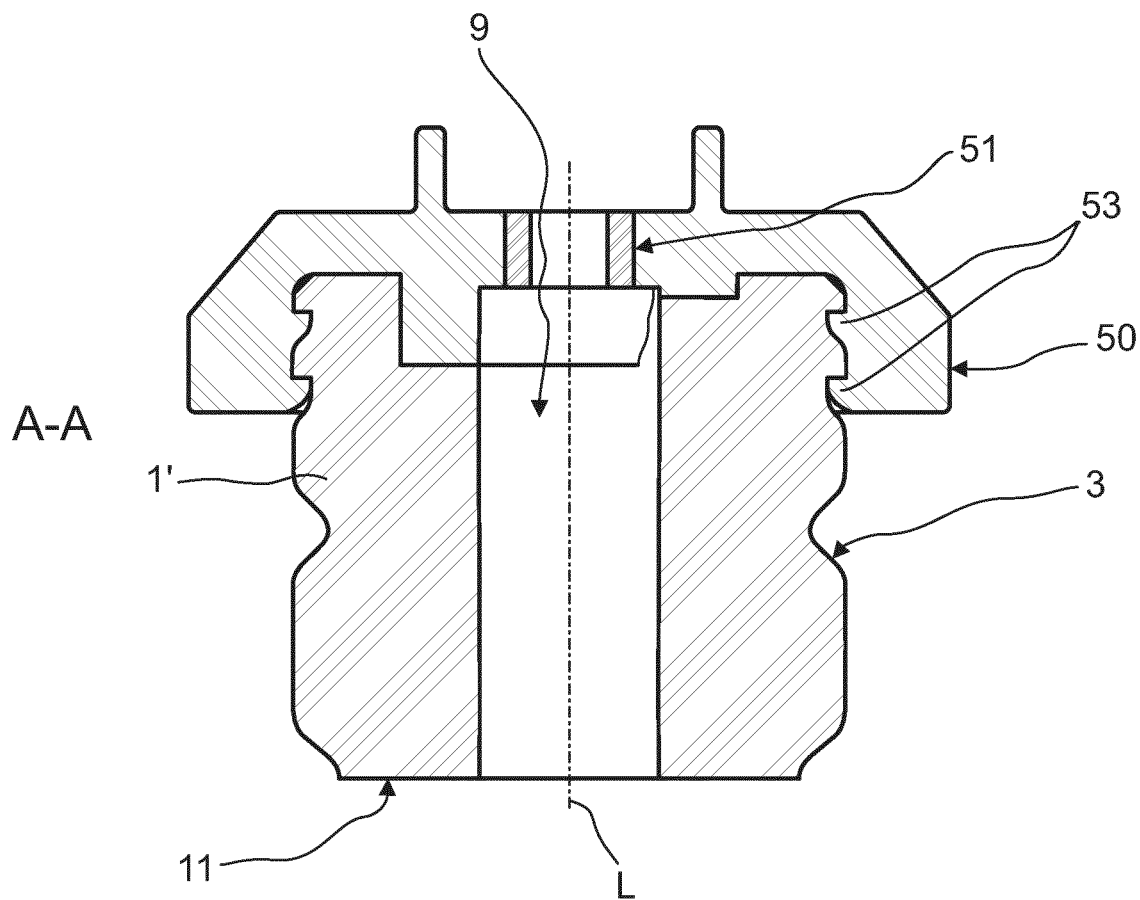
FIG. 6 shows a first cross sectional view of the embodiment of FIG. 5.
Figure 7:
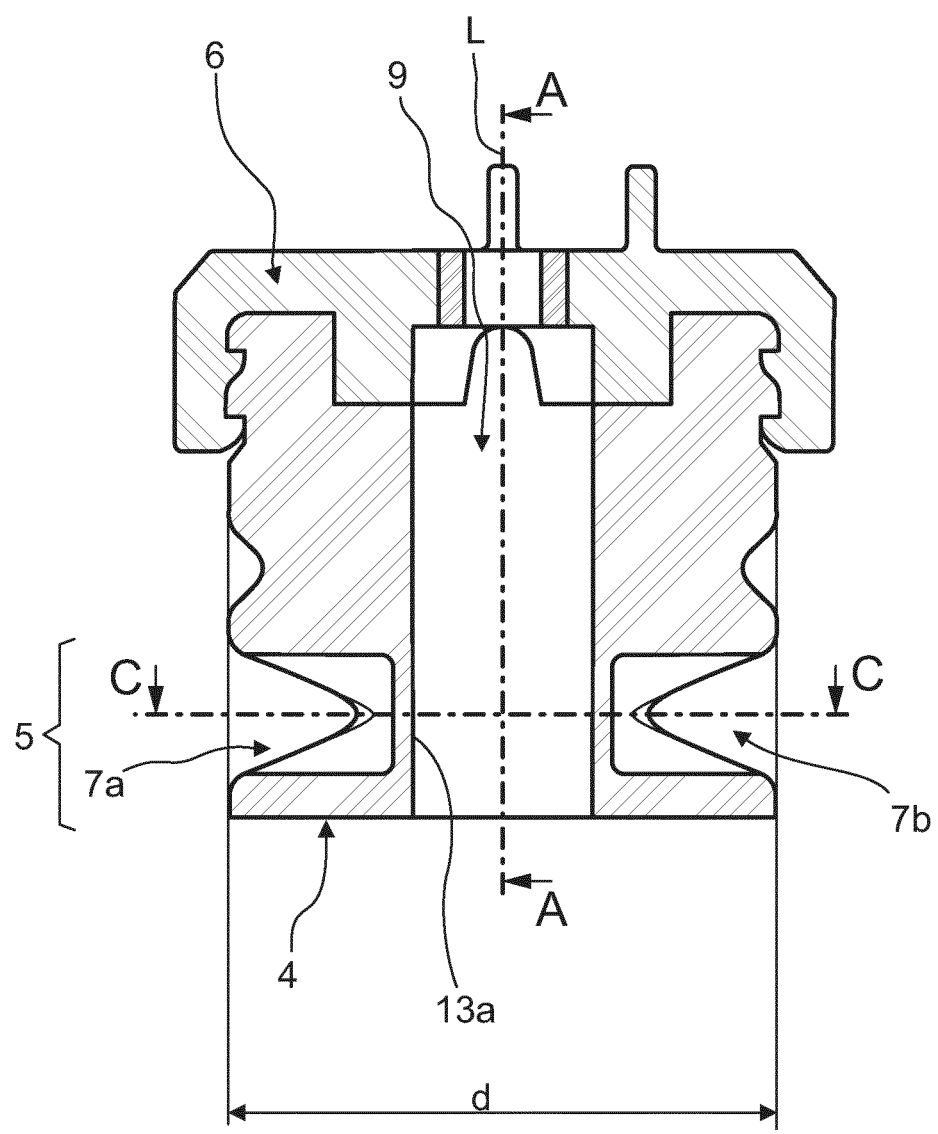
FIG. 7 shows a second cross sectional view of the embodiment shown in FIGS. 5 and 6.
Figure 8:
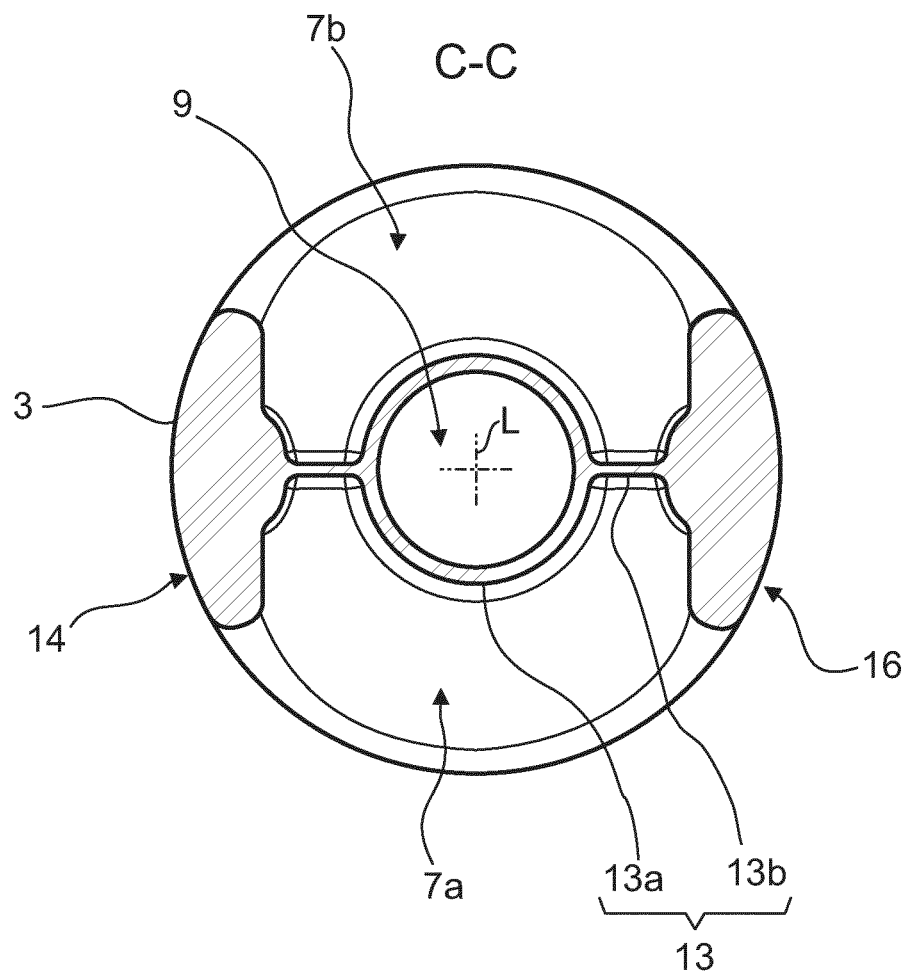
FIG. 8 shows a third cross sectional view of the embodiment of FIGS. 5-7.
Figure 9:
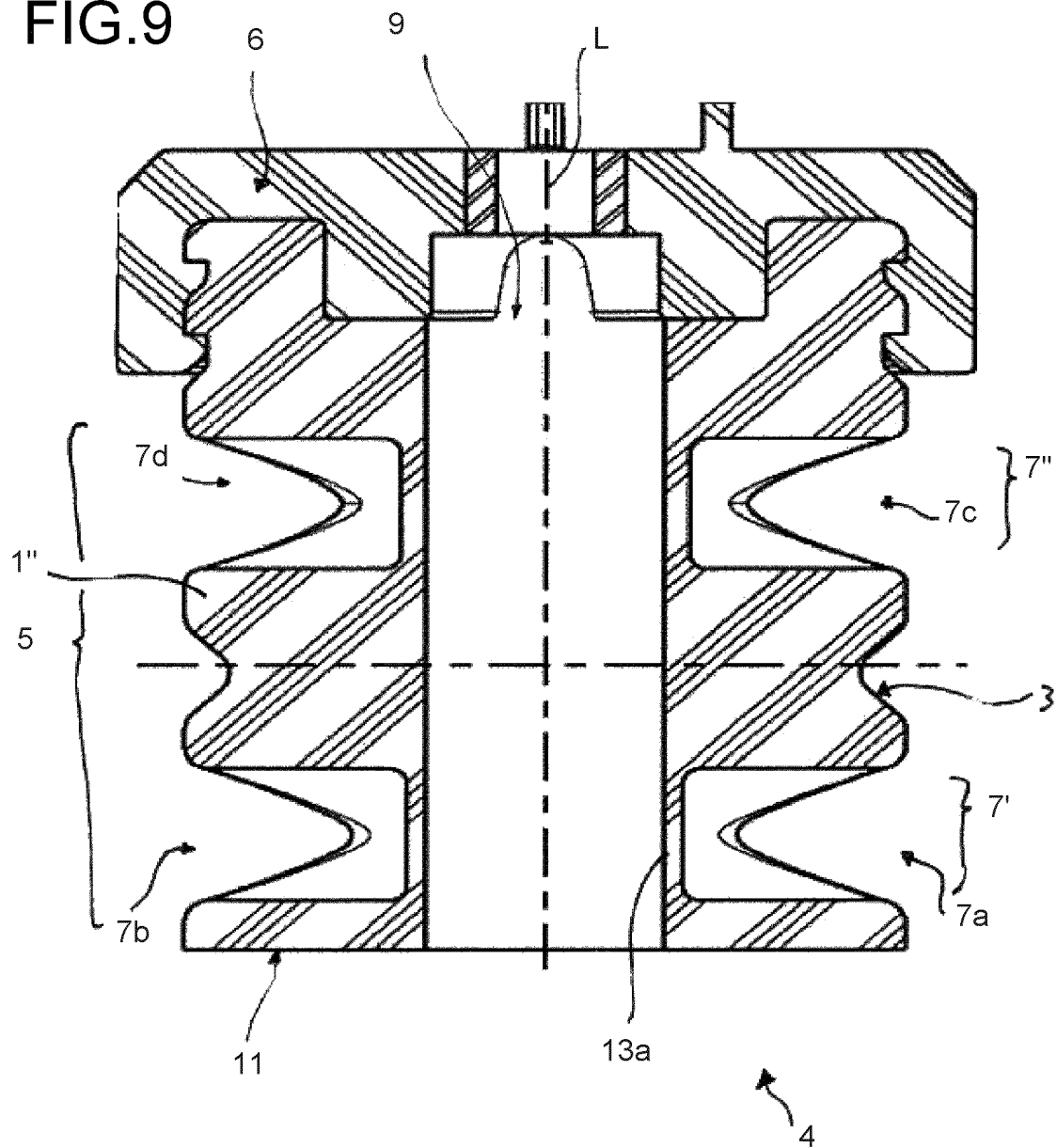
FIG. 9 shows a cross sectional view of a third preferred embodiment.

The invention will hereinafter be described in more detail with reference to the accompanying drawings of a preferred embodiments herein, FIG. 1 shows a schematic representation of a jounce bumper assembly that is part of a vehicle suspension having a spring element according to a first preferred embodiment, FIG. 2 shows a first cross sectional view of the assembly of FIG. 1, FIG. 3 shows a second cross sectional view of the assembly of FIGS. 1 and 2, FIG. 4 shows a third cross sectional view of the embodiment of FIGS. 1-3, FIG. 5 shows a schematic representation of an assembly according to a second preferred embodiment, FIG. 6 shows a first cross sectional view of the embodiment of FIG. 5, FIG. 7 shows a second cross sectional view of the embodiment shown in FIGS. 5 and 6, FIG. 8 shows a third cross sectional view of the embodiment of FIGS. 5-7; and FIG. 9 shows a cross sectional view of a third preferred embodiment.

In FIG. 1, a jounce bumper assembly 100 is depicted. The jounce bumper assembly 100 comprises a spring element 1 and a spacer 50. The spring element 1 comprises a base body 3. The spring element 1 and spacer 50 are mounted together and held coaxially to a longitudinal axis L of the spring element 1. The spring element 1 comprises a tip end 4 and a base end 6 which is mounted in the spacer 50. On the tip end 4, the spring element 1 comprises an end portion 5 having a circumferential outer surface 2. A recess 7 is formed in the end portion 5 and extends from the outer circumferential surface 2 inwards towards the longitudinal axis.

As can be seen in FIG. 2, the recess 7 has an oblong, in this case elliptical, shape which is defined by a lateral width $w_l$ and an axial width $w_a$. The lateral width $w_l$ is greater than the axial width $w_a$. The lateral width is measured in a plain perpendicular to the longitudinal axis, and the axial width is parallel, in particular coaxial to the longitudinal axis L. The lateral width $w_l$ is smaller than diameter d of the base body 3 of the spring element 1.

On the base end 6, the base body 3 comprises a second end portion 8 having a plurality of retention elements 10 extending radially outwards from the base body 3. The retention elements 10 are in engagement with corresponding recesses and protrusions 53 provided on the spacer 50, and are axially spaced apart in the direction of the longitudinal axis to provide proper retention the base body 3 inside the spacer 50.

The spacer 50 comprises a sleeve insert 51 for installation purposes.

In addition to the laterally extending recess 7, the base body 3 comprises a further recess 9 extending coaxially to the longitudinal axis L, and at the present embodiment extending all the way through the base body 3 from the base end 6 to the tip end 4. The recesses 7, 9 intersect one another. In alternative preferred embodiments, the base body 3 is solid, i.e. without a coaxially extending recess.

As can best be seen from FIG. 3, the recess 7 extends all the way through the base body 3 from one side of the outer circumferential surface 3 to the opposite side of the outer circumferential surface 2. The recess 7 is spaced apart from a substantially planar surface (in the uncompressed state, which is shown) on the tip end 4 of the end portion 5.

By virtue of this, the base body in the cross section C-C shown in FIG. 4 is reduced to two parallel elongate pylons 14, 16, providing for significant flexibility of the end portion 5 of base body 3.

While FIGS. 1-4 show a first preferred embodiment of the invention, FIG. 5 shows a second preferred embodiment of a jounce bumper assembly 100' having the same spacer 50 as the first embodiment, but a modified spring element 1'. With respect to the spring element 1', most structural and functional features are identical to the spring element 1 show in FIGS. 1-4. For this reason, identical elements are provided with identical reference signs, and reference is made to the description hereinabove for those.

A main distinction between the two embodiments of FIGS. 1-4 on the one hand side and FIG. 5-8 on the other hand side is that there is a first recess 7a extending from the outer circumferential surface 2, and a second recess 7b extending from the opposite side of the outer circumferential surface 2. Both recesses 7a, 7b extend towards the longitudinal axis L, but only to a predetermined depth which is less than half the diameter d of the base body 3 of the spring element 1'.

FIG. 6 is a cross sectional view in a plane perpendicular to the direction in which the recesses 7a, 7b extend, which is why the recesses are not visible in FIG. 6. As can be seen from FIG. 6, in particular, the inner recess 9 extends coaxially along the longitudinal axis L entirely through the base body 3 of spring element 1' without being intersected by the lateral recesses 7a, b. The flexibility in the end portion 5 is not significantly impeded.

In FIG. 7, which is a cross sectional view perpendicular to the view of FIG. 6, the reduced depth of the recesses 7a, b is illustrated. In between the recesses 7a, b and the coaxial inner recess 9, a residual wall section 13a is formed. Also the recesses 7a, b are spaced apart from the tip end 4 of the end portion 5.

As can then be seen in FIG. 8, in addition to the peripheral pylons 14, 16, the base body additional comprises the residual wall section 13a and then two radially extending ribs 13b which close off the respective recesses 7a, 7b.

The embodiments shown in FIGS. 1-8 show a spring element 1; 1' having one or two recesses 7; 7a,b. Other configurations having a higher number of recesses arranged at identical or varying angles to one another are however also within the scope of the invention.

For example, FIG. 9 shows a spring element 1" which comprises, when compared to the above-described two embodiments, an elongated end portion 5. The spring element 1" comprises, in that end portion 5, a first set 7' of recesses 7a,b and, axially spaced apart therefrom, in the direction of the longitudinal axis L, a second set 7" of recesses 7c,d. In the embodiment shown in FIG. 9, the recesses are formed in the same manner as they are formed in the second preferred embodiment of the invention. It would however also be within the scope of the invention if the first set of recesses 7' were to consists of one continuous recess as in the first preferred embodiment, and the second set of recesses 7" were also to consist of one continuous recess as in the first preferred embodiment.

Also, embodiments are within the scope of invention wherein the end portion 5 comprises one continuous recess extending all through the base body as in the first embodiment, and, axially spaced apart therefrom, a set of two recesses as in the second and third embodiments. For identical reference signs, reference is made to the description herein above for FIGS. 1-8 to avoid a necessary repetition.

Furthermore, while both embodiments show only a recess 7; 7a,b with an elliptical cross section, other cross sectional shapes of the recess are also within the scope of the invention as explained in the description above. For example, the recesses 7; 7a,b might have a cross section that is polygonal, for example rectangular, or shaped as a combination of a polygon and rounded/curved edges.

The invention claimed is:

1. A spring element, comprising:
a longitudinal axis and a base body extending along the longitudinal axis, the base body being elastically deformable between an uncompressed basic state and a compressed state in which the base body is at least partially compressed in the direction of the longitudinal axis, and
an end portion configured for being brought into contact with a vehicle part moving relatively to the spring element;
wherein the end portion comprises a circumferential outer surface and at least one recess in the circumferential outer surface, said at least one recess extending inwards and defining a hollow space in the base body,
wherein the end portion comprises an end face, and the at least one recess is spaced apart from the end face in the direction of the longitudinal axis,
wherein the end face, in the uncompressed basic state of the base body, comprises a substantially planar surface and is oriented perpendicular to the longitudinal axis, and the at least one recess is configured to collapse to allow the end face to assume a concave shape,
wherein the at least one recess extends all the way through the base body.

2. A spring element, comprising:
a longitudinal axis and a base body extending along the longitudinal axis, the base body being elastically deformable between an uncompressed basic state and a compressed state in which the base body is at least partially compressed in the direction of the longitudinal axis, and
an end portion configured for being brought into contact with a vehicle part moving relatively to the spring element;
wherein the end portion comprises a circumferential outer surface and at least one recess in the circumferential outer surface, said at least one recess extending inwards and defining a hollow space in the base body,
wherein the end portion comprises an end face, and the at least one recess is spaced apart from the end face in the direction of the longitudinal axis,
wherein the end face, in the uncompressed basic state of the base body, comprises a substantially planar surface and is oriented perpendicular to the longitudinal axis, and the at least one recess is configured to collapse to allow the end face to assume a concave shape,
wherein the at least one recess in the circumferential outer surface has an oblong cross section in a plane parallel to the longitudinal axis, and
wherein said oblong cross section is defined by a lateral width in a direction perpendicular to the longitudinal axis and an axial width in the direction of the longitudinal axis, and wherein the lateral width is greater than the axial width.

3. The spring element of claim 2, wherein the at least one recess extends radially towards the longitudinal axis, and has a maximal lateral width in a direction perpendicular to the longitudinal axis that is smaller than a diameter of the base body in the end portion.

4. The spring element of claim 3, wherein the maximal lateral width is 90% or less of the diameter of the base body in the end portion.

5. The spring element of claim 2, wherein the at least one recess extends to a predetermined depth in the base body, wherein said predetermined depth is less than half of the diameter of the base body.

6. The spring element of claim 5, comprising a first recess and a second recess opposite the first recess, each one extending to a predetermined depth in the base body, wherein said predetermined depth is less than half of the diameter of the base body.

7. The spring element of claim 2, wherein the base body comprises a recess, coaxial with the longitudinal axis, extending all the way through the end portion.

8. The spring element of claim 7, wherein the recess coaxial with the longitudinal axis extends all the way through the base body.

9. The spring element of claim 2, wherein the base body is partly or completely composed of an elastomer that is compressible in volume.

10. The spring element of claim 9, wherein the base body is partly or completely composed of a cellular polyisocyanate polyaddition product.

11. A jounce bumper assembly for damping a relative movement of two vehicle parts to one another, comprising the spring element of claim 2 configured to be operatively coupled to a first vehicle part,
wherein the end portion is positioned on the base body to face away from the first vehicle part when mounted, and is configured for being brought into contact with a second vehicle part moving relative to the spring element when mounted.

12. A vehicle, comprising:
a first vehicle part,
a second vehicle part, wherein the first vehicle part and the second vehicle part are configured to move relatively to one another during operation of the vehicle, and
at least one jounce bumper assembly according to claim 11, wherein the spring element is operatively coupled to the first vehicle part.

13. The vehicle of claim 12, wherein the second vehicle part comprises a convex surface oriented such that the longitudinal axis of the spring element intersects the convex surface.

14. The vehicle of claim 13, wherein the second vehicle part comprises a cylindrical surface.

15. The spring element of claim 2, wherein the spring element is a jounce bumper for a jounce bumper assembly.

16. The spring element of claim 2, wherein the lateral width is 110% of the axial width or greater.

17. The spring element of claim 2, wherein the lateral width is 200% of the axial width or greater.

18. A spring element, comprising:
a longitudinal axis and a base body extending along the longitudinal axis, the base body being elastically deformable between an uncompressed basic state and a compressed state in which the base body is at least partially compressed in the direction of the longitudinal axis, and
an end portion configured for being brought into contact with a vehicle part moving relatively to the spring element;
wherein the end portion comprises a circumferential outer surface and at least one recess in the circumferential outer surface, said at least one recess extending inwards and defining a hollow space in the base body,
wherein the end portion comprises an end face, and the at least one recess is spaced apart from the end face in the direction of the longitudinal axis,
wherein the end face, in the uncompressed basic state of the base body, comprises a substantially planar surface and is oriented perpendicular to the longitudinal axis, and the at least one recess is configured to collapse to allow the end face to assume a concave shape, wherein the base body comprises a plurality of recesses spaced-apart from one another in the direction of the longitudinal axis, in the circumferential outer surface, wherein said recesses respectively extend inwards and define a hollow space in the base body.

19. The spring element of claim 18, wherein at least one of the recesses spaced-apart from one another in the direction of the longitudinal axis extends to a predetermined depth in the base body, wherein said predetermined depth is less than half of the diameter of the base body.

\* \* \* \* \*